United States Patent
Duvent et al.

(10) Patent No.: US 7,858,920 B2
(45) Date of Patent: Dec. 28, 2010

(54) METHOD AND DEVICE FOR DETECTING AN OBJECT THAT CAN RETROREFLECT LIGHT

(75) Inventors: Jean-Louis Duvent, Nozay (FR); Jean Yves Thomas, Nozay (FR); Pierre Morin, Villebon sur Yvette (FR); Bernard Robic, La Ferte Saint Aubin (FR)

(73) Assignee: Campagnie Industielle des Lasers Cilas, Orleans (FR)

( * ) Notice: Subject to any disclaimer, the term of this patent is extended or adjusted under 35 U.S.C. 154(b) by 0 days.

(21) Appl. No.: 12/513,488

(22) PCT Filed: Nov. 22, 2007

(86) PCT No.: PCT/FR2007/001919
§ 371 (c)(1),
(2), (4) Date: May 4, 2009

(87) PCT Pub. No.: WO2008/071866
PCT Pub. Date: Jun. 19, 2008

(65) Prior Publication Data
US 2010/0065722 A1    Mar. 18, 2010

(30) Foreign Application Priority Data
Nov. 28, 2006    (FR) .................................. 06 10392

(51) Int. Cl.
*G01C 11/06*    (2006.01)

(52) U.S. Cl. ..................................... 250/221; 356/152.3
(58) Field of Classification Search ................. 250/221, 250/216, 559.4, 208.1; 356/152.3
See application file for complete search history.

(56) References Cited

U.S. PATENT DOCUMENTS

| 4,091,412 A | 5/1978 | Salonimer |
| 5,635,905 A * | 6/1997 | Blackburn et al. .......... 250/221 |
| 5,793,034 A * | 8/1998 | Wesolowicz et al. ........ 250/216 |
| 6,392,539 B1 * | 5/2002 | Kanasugi ..................... 250/221 |
| 2004/0208340 A1 | 10/2004 | Kirschner |

FOREIGN PATENT DOCUMENTS

| DE | 100 35 531 | 2/2002 |
| EP | 1 273 928 | 1/2003 |
| WO | 97/11353 | 3/1997 |
| WO | 00/39607 | 7/2000 |

OTHER PUBLICATIONS

International Search Report dated May 19, 2008 w/ English translation.
Written Opinion of the International Searching Authority with English translation.

\* cited by examiner

*Primary Examiner*—Seung C Sohn
(74) *Attorney, Agent, or Firm*—Dickinson Wright PLLC

(57) ABSTRACT

According to the invention, two simultaneous images with different wavelengths ($\lambda 1$, $\lambda 2$) are formed in synchronism with each illuminance laser pulse, one of the Images corresponding to the wavelength ($\lambda 1$) of the laser pulses, and the difference between the two images is generated.

7 Claims, 2 Drawing Sheets

METHOD AND DEVICE FOR DETECTING AN OBJECT THAT CAN RETROREFLECT LIGHT

The present invention relates to a method and a device for detecting an object able to retroreflect light. Although not exclusively, it is particularly appropriate to the detection of enlarging optics (including the eye) which present retroreflection properties by virtue of the so-called "cat's-eye effect" principle.

It is already known, to detect such an object, to illuminate the latter by a laser signal and form, through a filter tuned to the wavelength of said laser signal, images of the scene in which said object is located, during and between the illuminations of the latter by said laser signal. To do this, it is usual to implement sensors provided with matrix detectors, of CCD type.

Thus, in this known art, the detection of said retroreflecting object is achieved by comparing an image acquired on illumination by the laser signal and an image acquired outside of such illumination, so as to make the background scene disappear and make the laser echo originating from the retroreflection by said object appear.

This known art presents the drawback of generating false alarms originating from variations in the scene between the capturing of the two images, even if the time interval between them is very short. Such variations can be due to movements specific to sensors, to movements of objects in the scene, to a flickering effect from the reflections of the sun, and so on. A fortiori, this prior art cannot be used when there is a major relative movement between the sensor and said object to be detected.

The object of the present invention is to remedy this drawback.

To this end, according to the invention, the method for detecting an object located in a scene, a method whereby:
  said object is illuminated by a laser signal having a first wavelength;
  at least one first image of said scene in which said illuminated object is located is formed, through a first filter, the bandwidth of which is tuned to said first wavelength;
  at least one second image of said scene, in which said illuminated object is located, is formed, through a second filter, the bandwidth of which is tuned to a second wavelength different from said first wavelength, such that each first image has a corresponding second image; and
  third images are formed, each of them being the difference between a first image and the corresponding second image, is noteworthy in that:
  said laser signal illuminating said object is a series of laser pulses;
  a first image and the corresponding second image are formed in strict synchronism with each laser pulse of said series; and
  said second wavelength is sufficiently close to said first wavelength for the backscattering of the solar light by said scene to be at least approximately similar in a first image and in the corresponding second image.

Thus, according to the invention, pairs of images are obtained from the same scene at the same instant and in two different spectral domains, such that one of the images of a pair (the first) represents said scene and the laser echo on said object, whereas the other image of said pair (the second) represents only said scene without said laser echo. The result is then that the movement effects and flickering effects from the light are the same in the two images of a pair and are eliminated when the difference image is formed.

Thanks to the fact that said second wavelength, although different from said first wavelength, is sufficiently close to the latter for the backscattering of the solar light by said scene to be approximately similar in a first image and in the corresponding simultaneous second image, similar sensitivities are obtained for the first and second images in the sensor used to form them.

According to another aspect of the present invention, a system for detecting an object located in a scene, a system comprising:
  an emitter illuminating said object by a laser signal having a first wavelength;
  a receiver comprising:
    first detection means of CCD type, looking at the scene in which said object is located through a first filter, the bandwidth of which is tuned to said first wavelength;
    first control means able to control, by said first detection means, the integration and the reading of at least one first image of said scene in which said object illuminated by said emitter is located;
    second detection means of CCD type, looking at said scene in which said object is located through a second filter, the bandwidth of which is tuned to a second wavelength different from said first wavelength;
    second control means able to control, by said second detection means, the integration and reading of at least one second image of said scene, in which said object illuminated by said emitter is located, such that each first image has a corresponding second image; and
  processing means for forming the differences between a first image and the corresponding second image, is noteworthy in that:
  said emitter emits a signal comprising a series of laser pulses;
  said first and second control means form a first image and the corresponding second image in strict synchronism with each laser pulse of said series; and
  said second wavelength is sufficiently close to said first wavelength for the backscattering of the solar light by said scene to be at least approximately similar in a first image and in the corresponding second image.

Said first and second detection means can be respectively formed by individual CCD detectors or even by parts of a single common CCD detector.

Moreover, said first control means and said second control means can form a control unit common to said first and second detection means.

Advantageously, the system comprises an optical system common to said first and said second detection means.

When said system is intended for the detection of an object able to retroreflect light, it is advantageous for said emitter and said receiver to be close to one another.

The figures of the appended drawing will clearly show how the invention can be implemented. In these figures, identical references denote similar elements.

FIG. 1 diagrammatically illustrates a system for detecting an object which can retroreflect light.

Figure 1:
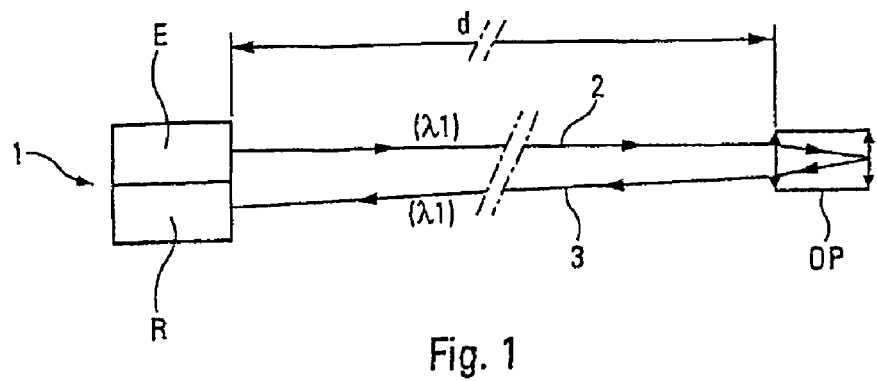

The detection system 1 represented in FIG. 1 comprises a laser emitter E and a receiver R close to one another and even joined to one another. Its object is to detect an object OP, for example a targeted optical system, an eye, etc., which can retroreflect the light that it receives. To do this, the system 1 is directed towards the object OP and its emitter E illuminates the latter with a series of incident laser pulses li (see timing diagram A of FIG. 3) along an incident light path 2, and having a predetermined wavelength $\lambda 1$.

Since the object OP retroreflects light, said laser pulses are retroreflected towards the detection system 1, along a reflected light path 3. The laser pulses duly retroreflected and seen by the receiver R are denoted by the reference lr in timing diagram B of FIG. 3. Of course, if the distance separating the detection system 1 from the object OP is equal to d, the retroreflected laser pulses are delayed by a period $\tau=2d/c$, an expression in which c is the speed of light.

Figure 2:
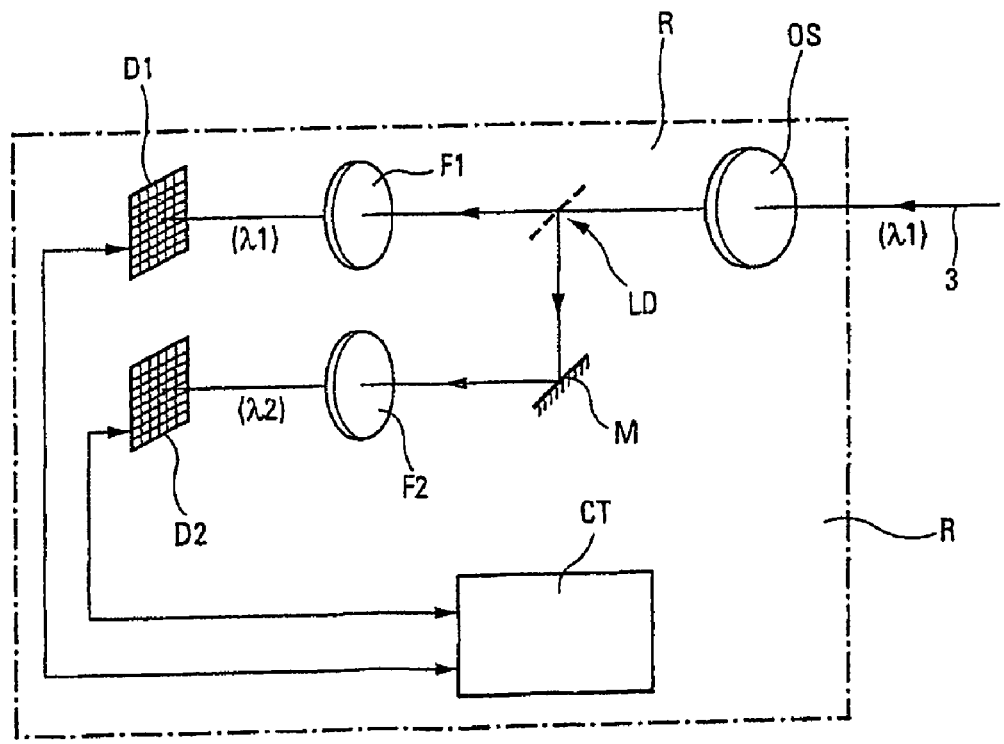
FIG. 2 shows the block diagram of the receiver of such a detection system according to the present invention.

As diagrammatically shown in FIG. 2, the receiver R comprises a single optical system OS, pointed towards the object OP and receiving the laser pulses lr retroreflected along the path 3.

The receiver R also comprises two identical detection devices D1 and D2 in parallel, of CCD type, positioned in the focal plane of the optical system OS and linked with an electronic control and image processing block CT, common to the two devices D1 and D2. The latter can be two individual CCD detectors or even two parts of one and the same CCD detector.

The light path 3 reaches the detection device D1 through a splitter device LD, such as a beam splitter or a splitter cube, and through a filter F1 tuned to the wavelength $\lambda 1$ of the laser pulses li and lr.

Furthermore, the light path 3 reaches the detection device D2 after reflection on the splitter device LD and on a possible mirror M and having passed through a filter F2 tuned to a wavelength $\lambda 2$, different from the wavelength $\lambda 1$.

In a known manner, the detection devices D1 and D2 can comprise a matrix of photosensitive elements positioned in a cooler. The filters F1 and F2 can also be of cooled type and be housed in said cooler.

Figure 3:
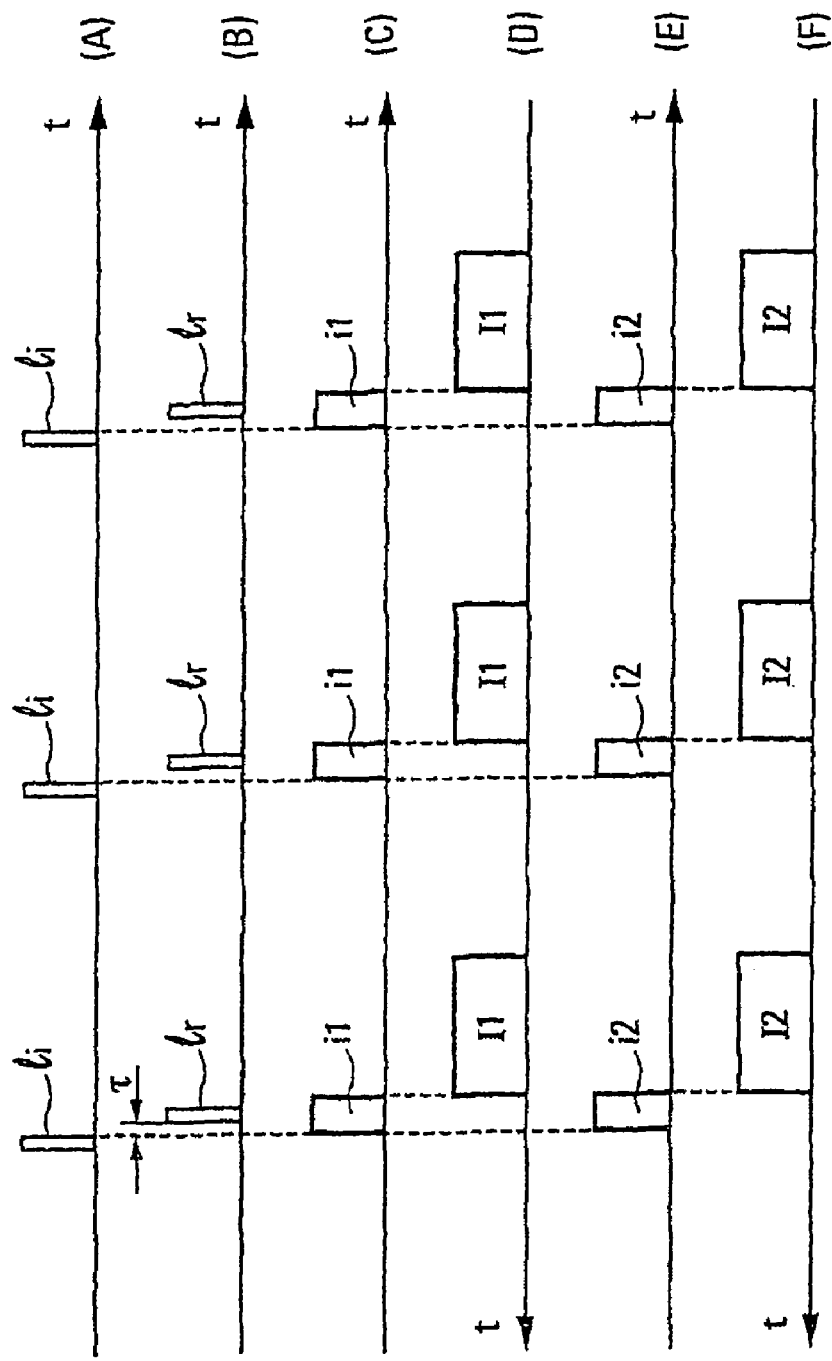
FIG. 3 shows, as a function of the time t, timing diagrams illustrating the operation of said detection system according to the present invention.

As illustrated by the timing diagrams C and E of FIG. 3, in synchronism with the emission of each incident laser pulse Li by the emitter E, the electronic block CT opens an integration window i1 for the detection device D1 and an integration window i2 for the detection device D2. Each integration window i1 and i2 contains all of the corresponding retroreflected laser pulse lr and begins as early as possible to emit the corresponding incident laser pulse li (situation represented in FIG. 3). However, the start of the integration windows i1 and i2 can be situated time-wise between the instant of the emission of the corresponding incident laser pulse li and this instant plus the period $\tau$ mentioned hereinabove. Furthermore, the opening times of the integration windows i1 and i2 (a few tens of microseconds) are the same.

The reading of the detection devices D1 and D2 by the electronic block CT, after closure of each integration window i1 and i2, makes it possible to obtain images I1 and I2, respectively (see timing diagrams D and F of FIG. 3).

It will easily be understood that the images I1 and I2, associated with one and the same retroreflected laser pulse lr, are identical except with respect to the presence of the object OP. In effect, the image I1, produced at the wavelength $\lambda 1$, comprises not only the scene in which the object OP is located, but also the latter illuminated by the corresponding incident laser pulse li of wavelength $\lambda 1$. On the other hand, the image I2, produced at the wavelength $\lambda 2$, cannot have said object OP illuminated at the wavelength $\lambda 1$, so that the image I2 comprises only the scene in which said object OP is located.

Thus, by subtracting an image I2 from the associated image I1, an image is obtained from which said scene is eliminated, only said illuminated object OP remaining. It is then easy to determine the position of the image of said object OP in the duly obtained difference image and, consequently, the position of said object OP relative to said detection system 1.

The invention claimed is:

1. A method for detecting an object located in a scene, comprising;
    illuminating said object by a laser signal having a first wavelength;
    forming at least one first image of said scene in which said illuminated object is located, through a first filter, a bandwidth of said first filter tuned to said first wavelength;
    forming at least one second image of said scene, in which said illuminated object is located, through a second filter, a bandwidth of said second filter being tuned to a second wavelength different from said first wavelength, such that each first image has a corresponding second image; and
    forming third images each of which is a difference between one of the first images and the corresponding second image,
    wherein:
    said laser signal illuminating said object comprises a series of laser pulses;
    the first image and the corresponding second image are formed in strict synchronism with each laser pulse of said series; and
    said second wavelength is sufficiently close to said first wavelength for a backscattering of solar light by said scene to be at least approximately similar in the first image and in the corresponding second image.

2. A system for detecting an object located in a scene, comprising:
    an emitter that illuminates said object by a laser signal having a first wavelength; and
    a receiver comprising:
        a first detection section of a charged-coupled device (CCD) type that detects the scene in which said object is located through a first filter a bandwidth of which is tuned to said first wavelength;
        a first control section that is operable to control, by said first detection section, an integration and a reading of at least one first image of said scene in which said object illuminated by said emitter is located;
        a second detection section of the CCD type that detects said scene in which said object is located through a second filter a bandwidth of which is tuned to a second wavelength different from said first wavelength;
        a second control section that is operable to control, by said second detection section, an integration and a reading of at least one second image of said scene in which said object illuminated by said emitter is located, such that each first image has a corresponding second image; and
        a processing section that forms differences between the first image and the corresponding second image,
    wherein:
    said emitter emits a signal comprising a series of laser pulses;

said first and second control sections form the first image and the corresponding second image in strict synchronism with each laser pulse of said series; and said second wavelength is sufficiently close to said first wavelength for a backscattering of solar light by said scene to be at least approximately similar in a first image and in the corresponding second image.

3. The system as claimed in claim 2, wherein said first detection section and said second detection section are respectively formed by individual CCD detectors.

4. The system as claimed in claim 2, wherein said first detection section and said second detection section are respectively formed by parts of a common CCD detector.

5. The system as claimed in claim 2, wherein said first control section and said second control section form a control unit common to said first and second detection sections.

6. The system as claimed in claim 2, wherein said receiver is provided with an optical system directed towards said scene, wherein said optical system is common to said first and said second detection sections.

7. The system as claimed in claim 2, wherein the first detection section and the second detection section are configured to detect an object which retroreflects light, wherein said emitter and said receiver are disposed close to one another.

\* \* \* \* \*